United States Patent
Brown

(10) Patent No.: US 10,822,112 B2
(45) Date of Patent: Nov. 3, 2020

(54) SLOPE-BASED EVENT DETECTION FOR TURBINE ENGINES

(71) Applicant: General Electric Company, Schenectady, NY (US)

(72) Inventor: Thomas William Brown, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 119 days.

(21) Appl. No.: 15/896,165

(22) Filed: Feb. 14, 2018

(65) Prior Publication Data

US 2019/0248505 A1    Aug. 15, 2019

(51) Int. Cl.
| | | |
|---|---|---|
| B64D 45/00 | (2006.01) | |
| B64D 27/16 | (2006.01) | |
| F02C 7/047 | (2006.01) | |
| F02C 9/18 | (2006.01) | |
| F02C 9/00 | (2006.01) | |

(52) U.S. Cl.
CPC ............ *B64D 45/00* (2013.01); *B64D 27/16* (2013.01); *F02C 7/047* (2013.01); *F02C 9/00* (2013.01); *F02C 9/18* (2013.01); *B64D 2045/0085* (2013.01); *F05D 2220/323* (2013.01); *F05D 2260/80* (2013.01); *F05D 2260/83* (2013.01); *F05D 2270/09* (2013.01)

(58) Field of Classification Search
CPC ............ B64D 45/00; B64D 2045/0085; B64D 27/16; F02C 7/047; F02C 9/00; F02C 9/18
See application file for complete search history.

(56) References Cited

U.S. PATENT DOCUMENTS

| | | | | |
|---|---|---|---|---|
| 3,979,903 | A | * | 9/1976 | Hull, Jr. .................... F02C 7/05 60/39.092 |
| 4,267,458 | A | * | 5/1981 | Uram ...................... F01D 17/24 290/40 R |
| 4,687,946 | A | * | 8/1987 | Jones ...................... F01D 17/20 290/40 R |
| 4,984,505 | A | * | 1/1991 | Leeson ................... F15B 13/07 137/596.17 |
| 6,059,522 | A | | 5/2000 | Gertz et al. |
| 6,782,701 | B2 | | 8/2004 | Liu et al. |
| 7,536,865 | B2 | | 5/2009 | Mikhail |
| 7,647,778 | B2 | | 1/2010 | Zewde et al. |
| 7,946,104 | B2 | | 5/2011 | Frank et al. |
| 9,272,787 | B2 | | 3/2016 | Couture et al. |

(Continued)

*Primary Examiner* — Behrang Badii
*Assistant Examiner* — Daniel L Greene
(74) *Attorney, Agent, or Firm* — Dority & Manning, P.A.

(57) ABSTRACT

Methods for detecting events, e.g., failures, in actuating systems for turbine engines are provided. In one exemplary aspect, a first slope and a second slope are determined. The first slope is determined by calculating the slope of an engine operating characteristic as a function of time prior to an actuation command. The second slope is determined by calculating the slope of the engine operating characteristic as a function of time after the actuation command. Thereafter, a delta slope is generated based at least in part on the difference between the first slope and the second slope. The delta slope is then compared to a predetermined threshold to determine whether a failure in the actuating system has occurred. Turbine engines configured to detect such events are also provided.

20 Claims, 8 Drawing Sheets

(56) References Cited

U.S. PATENT DOCUMENTS

| | | |
|---|---|---|
| 9,650,967 B2 | 5/2017 | DeFrancesco |
| 10,200,110 B2 * | 2/2019 | Reiffer, Jr. ............. H04L 69/168 |
| 2008/0152066 A1 * | 6/2008 | Jacobs ................... G21C 17/00 |
| | | 376/277 |
| 2011/0295575 A1 * | 12/2011 | Levine ................... G06Q 30/02 |
| | | 703/2 |
| 2012/0192544 A1 * | 8/2012 | Roby ........................ F02K 3/06 |
| | | 60/226.1 |
| 2016/0097323 A1 * | 4/2016 | Prather ................... F02C 7/047 |
| | | 415/178 |
| 2017/0067578 A1 | 3/2017 | Hoffman |
| 2017/0081997 A1 * | 3/2017 | Potyrailo ............ G01N 33/2888 |
| 2017/0210478 A1 * | 7/2017 | Mackin .................. B64D 15/12 |
| 2017/0268431 A1 * | 9/2017 | Schwarz ................ B64D 15/04 |
| 2017/0284304 A1 | 10/2017 | Nestico et al. |
| 2017/0323274 A1 * | 11/2017 | Johnson ................ G05B 13/041 |
| 2017/0323403 A1 * | 11/2017 | Johnson ........... G06Q 10/06315 |
| 2018/0355814 A1 * | 12/2018 | Magner ................. F02D 41/221 |
| 2019/0156600 A1 * | 5/2019 | Potyrailo ............. G07C 5/0816 |

\* cited by examiner

SLOPE-BASED EVENT DETECTION FOR TURBINE ENGINES

FIELD

The present subject matter relates generally to turbine engines and particularly to failure event detection methods and systems for components of turbine engines.

BACKGROUND

A gas turbine engine generally includes, in serial flow order, a compressor section, a combustion section, a turbine section and an exhaust section. In operation, air enters an inlet of the compressor section where one or more axial compressors progressively compress the air until it reaches the combustion section. Fuel is mixed with the compressed air and burned within the combustion section to provide combustion gases. The combustion gases are routed from the combustion section through a hot gas path defined within the turbine section and then exhausted from the turbine section via the exhaust section.

When designing gas turbine engines, a common goal is to improve efficiency and enhance performance. In this regard, due to the varying operating conditions that exist during operation of a gas turbine engine, it is often desirable to design components that can be actuated or reconfigured to adapt to changing operating conditions within the engine, thereby increasing their associated operating efficiency/performance. In some instances, the linkages coupling such actuating components with their associated actuators may break or become inoperable. When this occurs, sensor feedback may indicate that the actuator is in fact slewing or operating, yet the actuating component is not actually moving because of the broken or inoperable linkage. Means of detecting such latent failures are desirable.

One solution to detect such latent failures is the addition of hardware components, e.g., a sensor positioned downstream of the actuating component. For instance, for detection of a breakage in the linkage between a Booster Anti-Ice (BAI) valve and its associated actuator, a pressure sensor may be positioned downstream to detect pressure spikes and drops that would typically be expected with opening and closing of the valve. However, this solution requires additional hardware, which may increase the weight and cost of the engine. Another solution for detecting latent failures includes generating a short term and long term lag signal for a particular operating characteristic as a function of time. The difference between such short term and long term lag signals is used to detect valve movement. However, such method is susceptible to false positives when the engine operating characteristic trends upward or downwards and has proved to be unreliable in other instances. Other solutions have likewise proved ineffective or require that additional hardware be added to the engine.

Accordingly, failure event detection methods for turbine engines that address one or more of the challenges noted above would be useful.

BRIEF DESCRIPTION

Aspects and advantages of the invention will be set forth in part in the following description, or may be obvious from the description, or may be learned through practice of the invention.

In one aspect, the present disclosure is directed to a method for detecting an event of an actuating system of a gas turbine engine for an aircraft. The method includes determining, by one or more controllers, a first slope based at least in part on a signal descriptive of an engine operating characteristic as a function of time prior to an actuation command. The method also includes determining, by the one or more controllers, a second slope based at least in part on the signal descriptive of the engine operating characteristic as a function of time after the actuation command. Further, the method includes generating, by the one or more controllers, a delta slope based at least in part on the difference between the first slope and the second slope. In addition, the method includes determining, by the one or more controllers, whether the delta slope exceeds a predetermined threshold to determine whether the event has occurred. Further, the method includes generating, if the event has occurred, a control action associated with resolving the event.

In another aspect, the present disclosure is directed to a turbine engine, such as a gas or steam turbine engine. The turbine engine includes an actuating component and an actuator for modulating the actuating component, the actuator having an actuator arm operatively coupling the actuator with the actuating component. The turbine engine also includes a fuel flow sensor, a pressure sensor, and a controller communicatively coupled with the actuator, the fuel flow sensor, and the pressure sensor. The controller is configured to: communicate an actuation command to the actuator to modulate the actuating component; determine a first slope based at least in part on a signal descriptive of an engine operating characteristic as a function of time prior to the actuation command; determine a second slope based at least in part on the signal descriptive of the engine operating characteristic as a function of time after the actuation command; generate a delta slope based at least in part on the difference between the first slope and the second slope; determine whether the delta slope exceeds a predetermined threshold to determine whether the event has occurred; and generate, if the event has occurred, a control action associated with resolving the event.

In a further aspect, the present disclosure is directed to a method for detecting a failure event of an actuating system for a turbine engine. The method includes generating, by one or more controllers, a lagged signal based at least in part on a raw signal that is descriptive of an engine operating characteristic as a function of time. The method also includes determining, by the one or more controllers, a first slope based at least in part on the lagged signal for a predetermined time prior to an actuation command. The method further includes determining, by the one or more controllers, a second slope based at least in part on the lagged signal for a predetermined time after the actuation command. Moreover, the method includes generating, by the one or more controllers, a delta slope based at least in part on the difference between the first slope and the second slope. In addition, the method includes determining, by the one or more controllers, whether the delta slope exceeds a predetermined threshold to determine whether the failure event has occurred. The method also includes generating, if the event has occurred, a control action associated with resolving the event.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
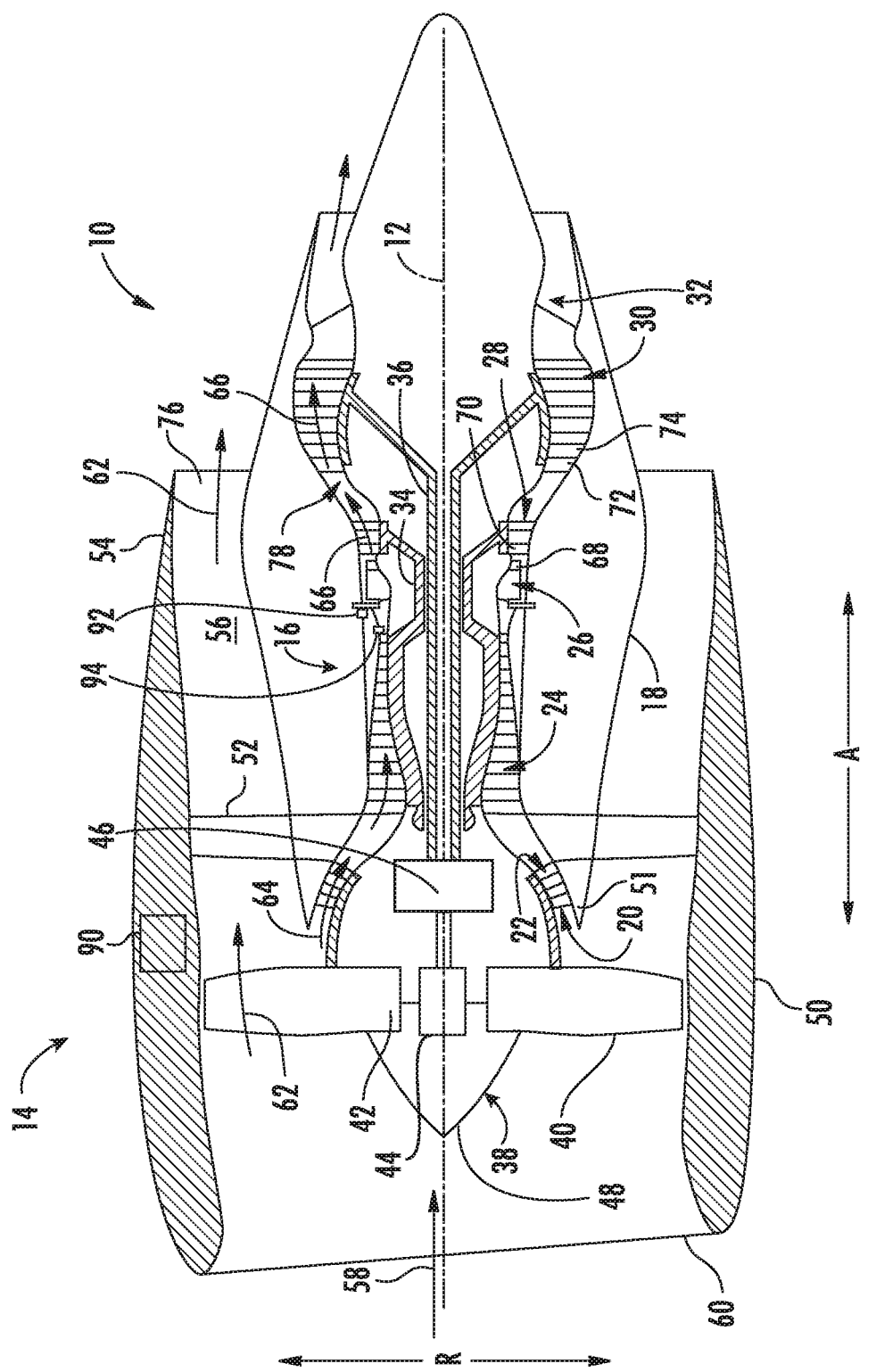
FIG. 1 provides a cross-sectional view of one embodiment of a gas turbine engine that may be utilized within an aircraft in accordance with aspects of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents. Furthermore, as used herein, terms of approximation, such as "approximately," "substantially," or "about," refer to being within a ten percent (10%) margin of error.

In general, the present disclosure is directed to methods for detecting failures in actuating systems. In one exemplary aspect, a first slope and a second slope are determined. The first slope is determined by calculating the slope of an engine operating characteristic as a function of time prior to a command to actuate a valve or other actuating component of the actuating system. As one example, the engine operating characteristic may be a phi φ, which is a fuel flow rate over a pressure. The second slope is determined by calculating the slope of the engine operating characteristic as a function of time after the command to actuate the valve. Once the first and second slopes are determined, a delta slope is generated based at least in part on the difference between the first slope and the second slope. The delta slope is then compared to a predetermined threshold to determine whether a failure in the actuating system has occurred. Turbine engines configured to detect such failures in their actuation systems are also provided.

FIG. 1 provides a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37. Additionally, a space between the casing 18 and the compressors 22, 24, a combustor of the combustion section 26, and the turbines 28, 30 may be referred to as an "under-cowl" area.

For the embodiment depicted, the fan section 14 includes a fixed-pitch fan 38 having a plurality of fan blades 40 coupled to a disk 42 in a circumferentially spaced apart manner. As is depicted, the fan blades 40 extend outwardly from disk 42 generally along the radial direction R. The fan blades 40 and disk 42 are together rotatable about the longitudinal axis 12 by LP shaft 36 across a reduction gearbox/power gear box 46. The reduction gearbox 46 includes a plurality of gears for adjusting, or rather, for reducing, the rotational speed of the fan 38 relative to the LP shaft 36 to a more efficient rotational fan speed.

Referring still to the exemplary embodiment of FIG. 1, the disk 42 is covered by rotatable front hub or spinner 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. The exemplary nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14 and passes across the fan blades 40. The volume of air 58 is then split at a flow splitter 51 into a first portion of air 62 that is directed or routed into the bypass airflow passage 56 and a second portion of air 64 is directed or routed into the core air flowpath 37, or more specifically into the booster or LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

In addition, as shown in FIG. 1, the turbofan engine 10 includes one or more controllers 90 (only one shown in FIG. 1) operatively configured to control various aspects of the turbofan engine 10, such as e.g., detecting latent failures of one or more actuating assemblies. Controller 90 can be, for example, an Electronic Engine Controller (EEC) or a Digital Engine Controller (DEC) equipped with Full Authority Digital Engine Control (FADEC). Controller 90 may be communicatively coupled with various computing devices of a vehicle to which turbofan engine 10 is mounted. For example, where turbofan engine is mounted to an aircraft, controller 90 may be communicatively coupled with a flight management system (FMS) of the aircraft. Controller 90 can include one or more processor(s) and one or more memory device(s). The one or more processor(s) can include any suitable processing device, such as a microprocessor, microcontroller, integrated circuit, logic device, and/or other suitable processing device. The one or more memory device(s) can include one or more computer-readable media, including, but not limited to, non-transitory computer-readable media, RAM, ROM, hard drives, flash drives, and/or other memory devices.

The one or more memory device(s) can store information accessible by the one or more processor(s), including computer-readable instructions that can be executed by the one or more processor(s). The instructions can be any set of instructions that when executed by the one or more processor(s), cause the one or more processor(s) to perform operations. In some embodiments, the instructions can be executed by the one or more processor(s) to cause the one or more processor(s) to perform operations, such as any of the operations and functions for which controller 90 is configured. The instructions can be software written in any suitable programming language or can be implemented in hardware. Additionally, and/or alternatively, the instructions can be executed in logically and/or virtually separate threads on processor(s). The memory device(s) can further store data that can be accessed by the one or more processor(s). For example, the data can include various thresholds that may be used to detect latent failures of actuating assemblies, as will be described in greater detail herein. The data can be stored in one of the memory device(s) of controller 90, which can be downloaded or transmitted to other computing systems, such as e.g., an offboard computing system.

The controller 90 can also include a communication interface for communicating with the other components (e.g., actuating components or actuators configured to actuate such components) via a communication bus. The communication interface can include any suitable components for interfacing with one or more network(s), including e.g., transmitters, receivers, ports, controllers, antennas, and/or other suitable components.

The controller 90 may be communicatively coupled with a communication network. Communication network can include, for example, a local area network (LAN), a wide area network (WAN), SATCOM network, VHF network, a HF network, a Wi-Fi network, a WiMAX network, a gatelink network, and/or any other suitable communications network for transmitting messages to and/or from the controller 90 to other computing systems, such as an FMS or offboard computing system. Such networking environments may use a wide variety of communication protocols.

Additionally, for the depicted embodiment of FIG. 1, controller 90 is communicatively coupled with a fuel flow sensor 92 and a pressure sensor 94. As shown, the fuel flow sensor 92 is positioned proximate the combustion section 26 and is operatively configured to sense a fuel flow rate $W_f$ of the fuel delivered to the combustion section 26. The fuel flow rate $W_f$ may have the units PPH, or pounds per hour, for example. The fuel flow sensor 92 may be positioned to sense the fuel flow rate $W_f$ into the combustion section 26 along any suitable fuel line or component of a fuel delivery system of turbofan engine 10. Moreover, as further shown in FIG. 4, the pressure sensor 94 is positioned downstream of the HP compressor 24 and upstream of the combustion section 26. In alternative embodiments, the pressure sensor 94 may be positioned in other suitable locations, such as e.g., downstream of the LP compressor 22 and upstream of the HP compressor 24. For this embodiment, pressure sensor 94 is operatively configured to sense the pressure of the airflow discharged from the HP compressor 24 (i.e., P3 air). In this way, controller 90 may receive inputs from the fuel flow sensor 92 and the pressure sensor 94 and calculate engine operating characteristics indicative of the performance and/or efficiency of the engine. For instance, the fuel flow rate $W_f$ obtained from the fuel flow sensor 92 and the pressure P3 obtained from the pressure sensor 94 may be used to chart or graph a phi signal $\varphi$ as a function of time (t) (see e.g., FIG. 3). The pressure P3 may be in the units PSI, or pounds per square inch.

It will be appreciated that the exemplary turbofan engine 10 depicted in FIG. 1 is by way of example only, and in other exemplary embodiments, the turbofan engine 10 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboshaft engine, turboprop engine, turbocore engine, turbojet engine, an aeroderivative engine, industrial turbine engines, steam turbine engines, etc. In addition, in other exemplary embodiments, aspects of the present disclosure may be incorporated into non-turbine engine actuating systems.

Figure 2:
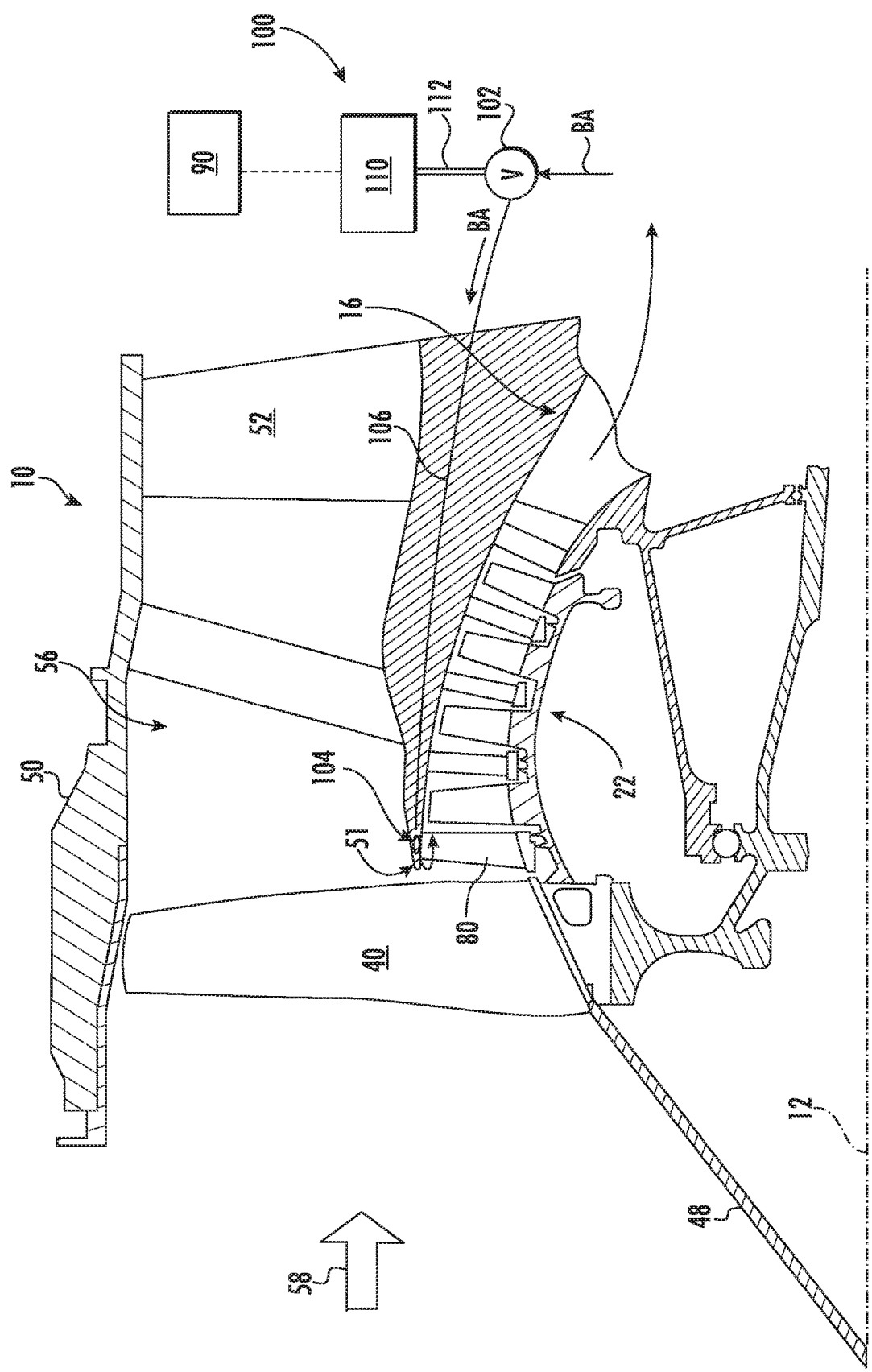
FIG. 2 provides a schematic, cross-sectional view of a fan section and a booster section of the exemplary gas turbine engine of FIG. 1.

FIG. 2 provides a schematic, cross-sectional view of a fan section and a booster section of the exemplary gas turbine engine of FIG. 1. Further, FIG. 2 provides a Booster Anti-Ice (BAI) assembly 100. As will be appreciated, the splitter nose 51 and leading edges of Inlet Guide Vanes 80 (IGVs) are subject to icing during certain operating conditions in the flight envelope. In such operating conditions, ice may form and accumulate on the splitter nose 51 and/or the IGVs 80. To counteract such icing, BAI assembly 100 includes features that warm the splitter nose 51 and IGVs 80 to prevent ice from forming thereon.

As depicted in FIG. 2, BAI assembly 100 includes a BAI valve 102 and an actuator 110 coupled or linked thereto by a linkage or actuator arm 112. Controller 90 is communicatively coupled with the actuator 110 for controlling actuator 110 such that BAI valve 102 is moveable between a closed position and a fully open position. BAI valve 102 may be a butterfly valve that may be modulated to effect a desired airflow therethrough. As shown in FIG. 2, hot bleed air BA may be bled off from the core turbine engine 16 downstream of the LP compressor 22. For instance, the hot bleed air BA may be bled off from a location downstream of the HP compressor 24 and upstream of the combustion section 26 (FIG. 1). When the BAI valve 102 is in an open position, the hot bleed air BA flows through the BAI valve 102 and through a duct 106 toward the splitter nose 51, e.g., in a forward direction along the axial direction A. The hot bleed air BA then exits duct 106 through an outlet 104 defined by the splitter nose 51. The hot bleed air BA then flows across the surfaces of the splitter nose 51 and the IGVs 80 to reduce, eliminate, or prevent the accumulation or formation of ice during operation of the turbofan engine 10.

In some instances, the linkage or actuator arm 112 coupling the BAI valve 102 with the actuator 110 may break or become inoperable. Other problems with the BAI valve 102 or actuator 110 may also occur. Methods and systems for detecting such failures are provided below.

Figure 3:
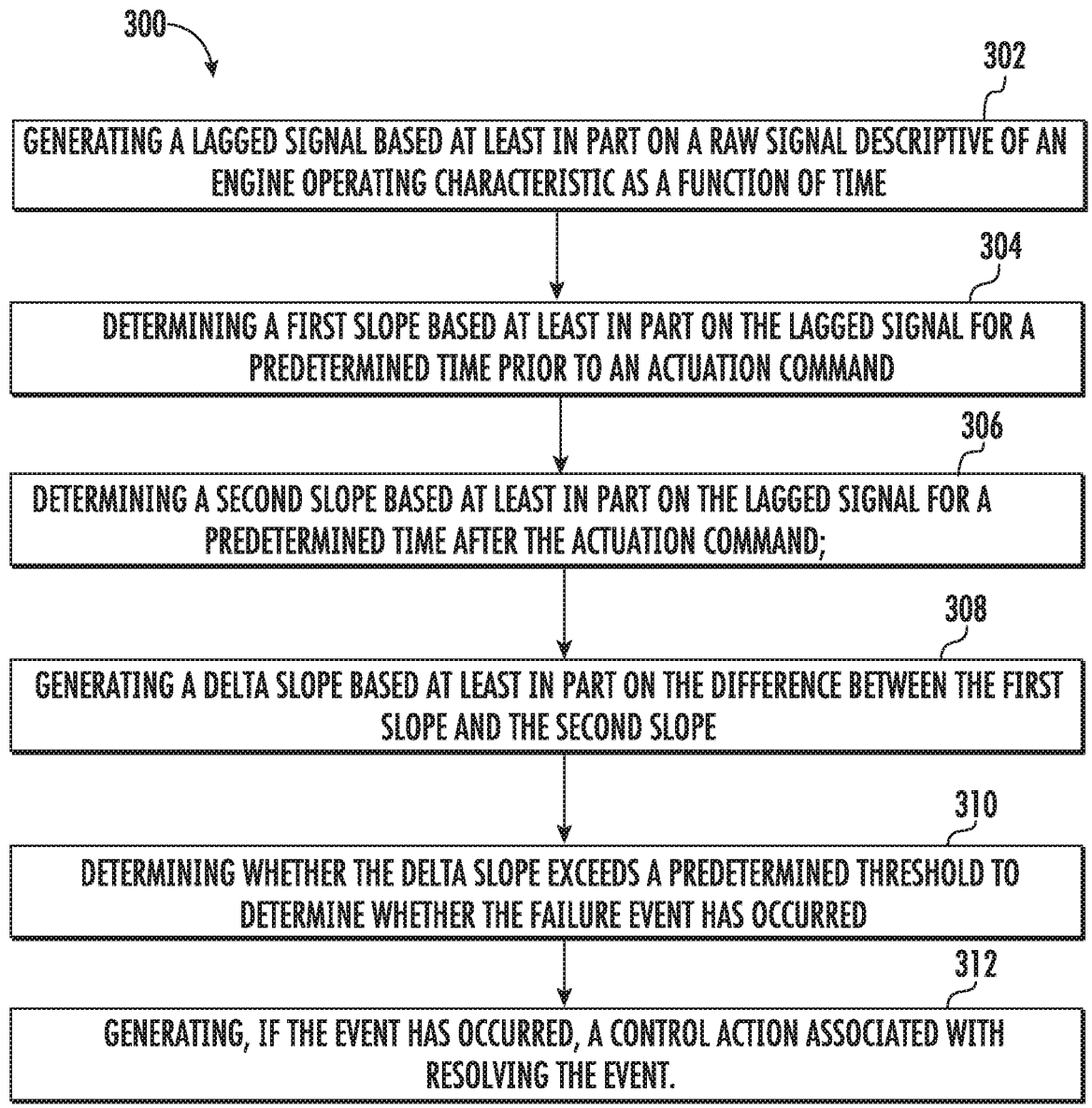
FIG. 3 provides a flow chart of an exemplary method for detecting latent failures of actuating components.
Figure 4:
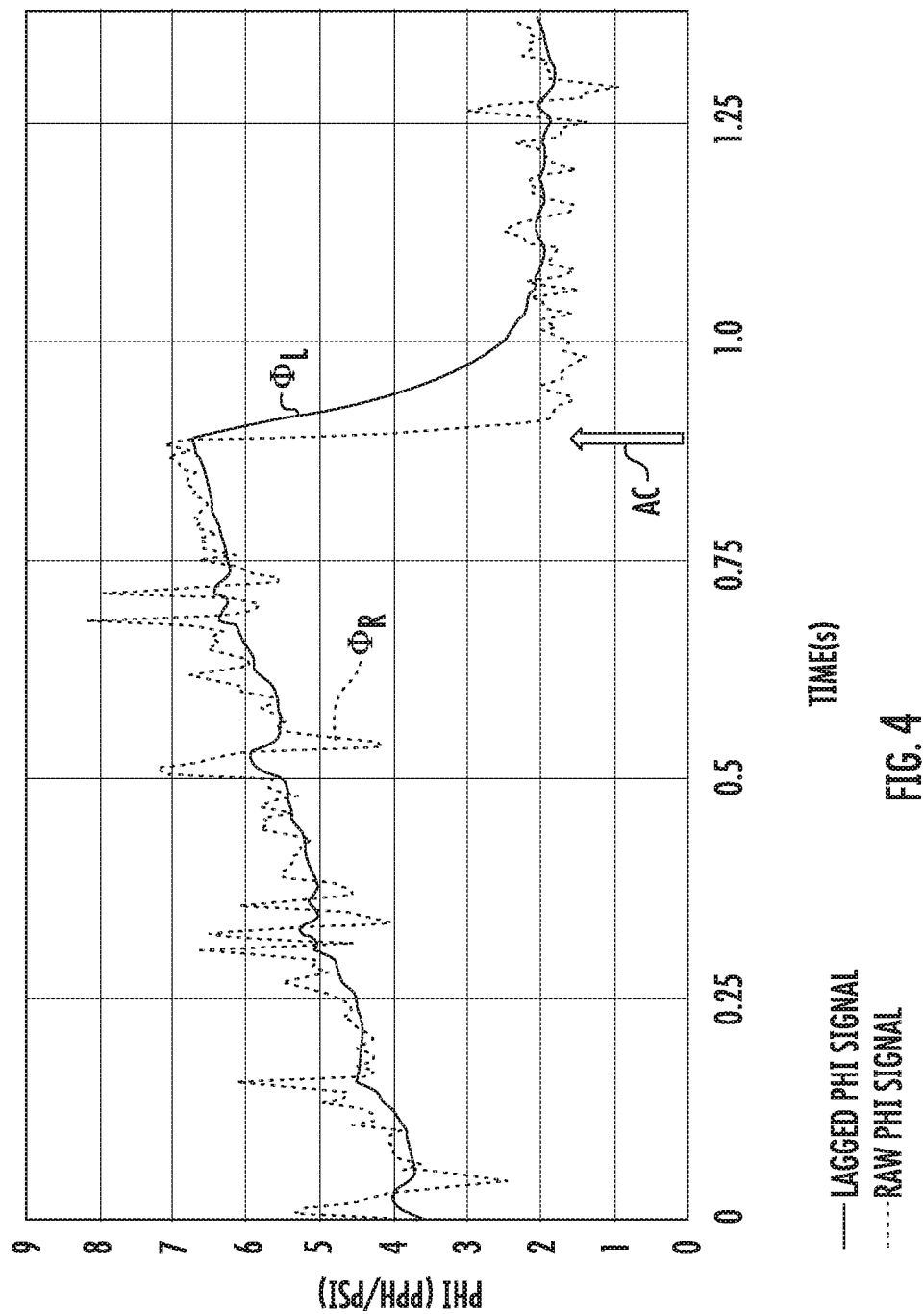
FIG. 4 provides a chart depicting a raw phi signal as a function of time and a lagged signal as a function of time for an actuating component commanded to move to a more closed position according to an exemplary embodiment of the present disclosure.
Figure 5:
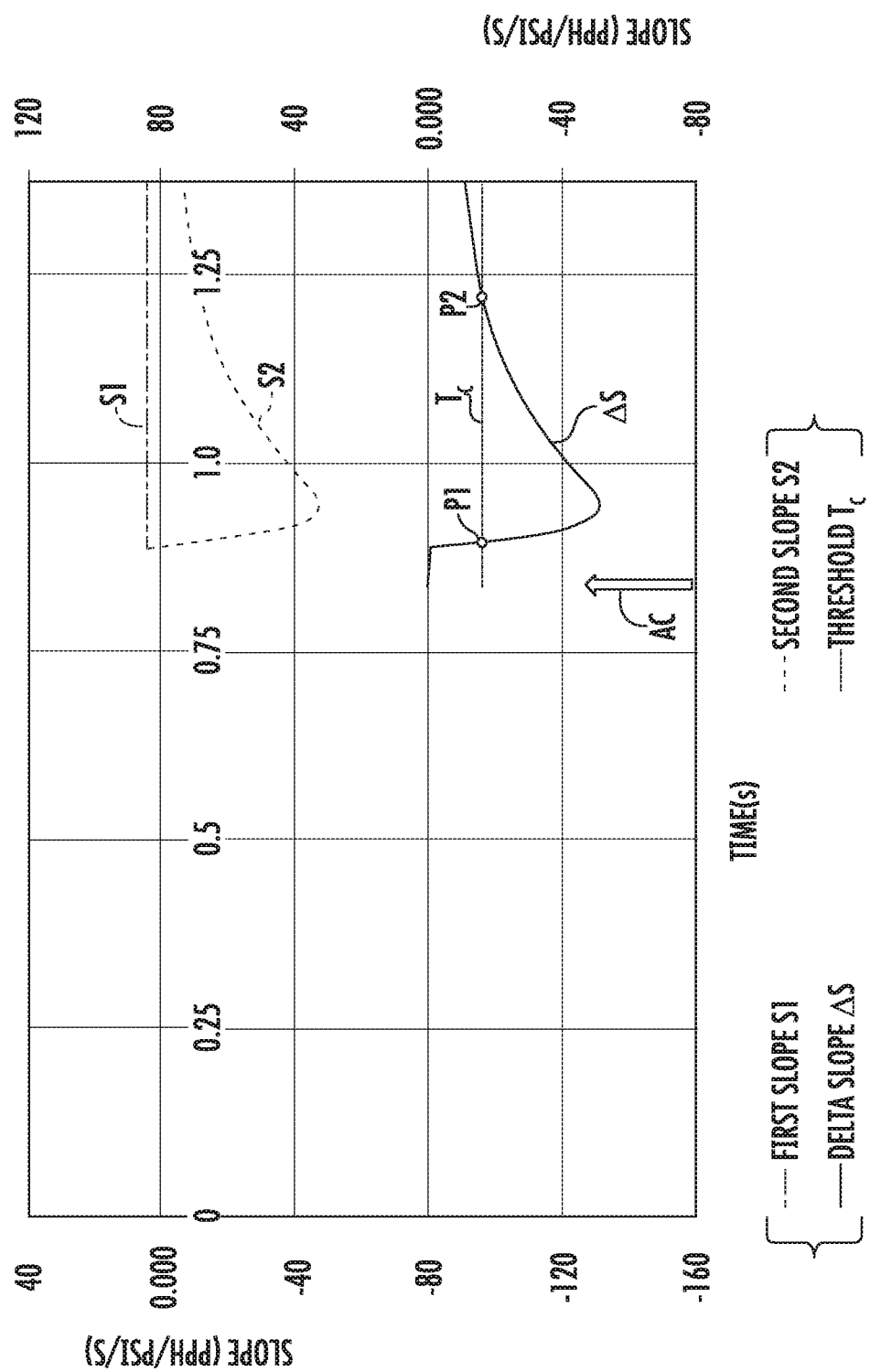
FIG. 5 provides a chart depicting a first slope as a function of time compared with a second slope as a function of time, as well as a delta slope as a function of time compared with a predetermined threshold according to an exemplary embodiment of the present disclosure.

FIG. 3 provides a flow chart of an exemplary method (300) for detecting latent failures of actuating systems. For this exemplary embodiment, the exemplary method (300) is provided for detecting latent failures of a BAI assembly, such as the BAI assembly 100 of FIG. 2. For context, reference numerals utilized to describe turbofan engine 10 of FIG. 1 and the BAI assembly 100 of FIG. 2 will be utilized below. Further, method (300) will be explained with reference to charts provided in FIGS. 4 and 5. As will be explained in greater detail below, FIG. 4 provides a chart depicting various phi signals as a function of time and FIG. 5 provides a chart depicting various slopes determined based on one or both of the phi signals of FIG. 4. Method (300) may be carried out at least in part by one or more controllers or other computing devices, such as e.g., controller 90 of turbofan engine 10 and an FMS of an aircraft to which turbofan engine 10 is mounted, and/or an offboard computing system that includes one or more computing devices.

At (302), the method (300) includes generating a lagged signal based at least in part on a raw signal that is descriptive of an engine operating characteristic as a function of time. For instance, the engine operating characteristic may be phi φ, which is defined as a mass flow rate over pressure ($W_f/P$), e.g., of a turbine engine. The pressure P may be a compressor discharge pressure P3, for example. In alternative embodiments, the engine operating characteristic may be other suitable engine operating characteristics indicative of the efficiency and/or performance of the engine.

By way of example, FIG. 4 provides a chart that depicts a raw phi signal $\varphi_R$ as a function of time (t) as well as a lagged phi signal $\varphi_L$ as a function of time (t). In this exemplary embodiment, the lagged phi signal $\varphi_L$ is generated based at least in part on the raw phi signal $\varphi_R$. For instance, a lag filter embedded within control logic of the controller 90 may determine the lagged phi signal $\varphi_L$ based at least in part on the raw phi signal $\varphi_R$. By generating a lagged phi signal $\varphi_L$, noise from the raw phi signal $\varphi_R$ is removed such that the signal becomes more useable for future calculations, as explained below.

At (304), the method (300) includes determining a first slope based at least in part on the lagged signal for a predetermined time prior to an actuation command. As shown in FIG. 4, as the turbofan engine 10 operates, phi φ generally increases or trends upward from zero seconds (0 s) to about eighty-eight hundredths seconds (0.88 s). During this timeframe, the BAI valve 102 is controlled to an open position. As the phi φ increases or trends upward, the efficiency of the turbofan engine 10 decreases. Then, as shown in FIG. 4, at about eighty-eight hundredths seconds (0.88 s) the BAI valve 102 is commanded to close. More particularly, controller 90 commands the actuator 110 to actuate such that the BAI valve 102 is modulated to a closed position. After the actuation command (denoted by the arrow AC and referred to herein as time (t)=0) at about eighty-eight hundredths seconds (0.88 s), the raw phi signal $\varphi_R$ decreases relatively rapidly from a phi value of about six and five tenths (6.5) to a phi value of about two (2) where the signal stabilizes just before about one second (1 s). The lagged phi signal $\varphi_L$ likewise decreases rapidly after the actuation command AC, but not quite at the rate of the raw phi signal $\varphi_R$ as the signal is lagged. When phi φ decreases, engine efficiency is increased.

For this exemplary embodiment, to determine the first slope S1, the slope of the lagged phi signal $\varphi_L$ is calculated prior to the actuation command AC for a predetermined time. The predetermined time may calculated as a number of time steps or iterations of the control logic, for example, or may simply be a set time. For instance, for this exemplary embodiment, the predetermined time is about one tenth of a second (1/10 s), or from 0.75 s to 0.88 s (see FIG. 5). In alternative exemplary embodiments, the predetermined time may be one second (1 s). As another example, the predetermined time may be two seconds (2 s). In yet another example, the predetermined time may be a half of a second (½ s).

Further, for this exemplary embodiment, to determine the first slope S1, the slope of the lagged phi signal $\varphi_L$ over the predetermined time is averaged. The average slope of the lagged phi signal $\varphi_L$ over the predetermined time (0.75 s to 0.88 s) is about three (3) in this example. Accordingly, as depicted in FIG. 5, utilizing the slope axis on the left of the chart, the first slope S1 is plotted at three (3). Moreover, notably, even though the first slope S1 is the average slope of the lagged phi signal $\varphi_L$ prior to the actuation command AC, the slope S1 is plotted on the chart in FIG. 5 at time t=0, or after the actuation command AC, as a function of time. In this way, as will be explained below, the first slope S1 may be compared to a second slope S2. In alternative exemplary embodiments, the first slope S1 is plotted as the actual slope of the lagged phi signal $\varphi_L$ over the predetermined time prior to the actuation command AC. In yet other embodiments, a best fit line through a plurality of vector points may be used to determine the first slope S1.

Further, in some embodiments, the lagged phi signal $\varphi_L$ is made up of a series of vector points that are stored, e.g., in a memory device of controller 90, and when the controller 90 commands an actuation command AC, the first slope S1 is determined by calculating a slope between the vector points for the predetermined time or number of time steps. Then, once the slopes are calculated between the vector points are determined, an average of the slopes between the vector points is calculated, and accordingly, the first slope S1 is the average of the slopes between the vector points. In some embodiments, the slopes between the vector points and the average thereof are calculated after the actuation command AC and are only calculated once. In this way, valuable processing resources of the controller 90 may be used for other processes instead of performing continuous calculations of the slope of the lagged phi signal $\varphi_L$.

At (306), the method (300) includes determining a second slope based at least in part on the lagged signal for a predetermined time after the actuation command. Continuing with the example above, after the actuation command AC at about eighty-eight hundredths seconds (0.88 s), the BAI valve 102 is commanded to close. When the actuator 110 modulates the BAI valve 102 to close, the raw phi signal $\varphi_R$ decreases relatively rapidly, as noted above. The lagged phi signal $\varphi_L$ likewise decreases rapidly after the actuation command AC. If there was a failure in some component of the BAI assembly 100, e.g., if the actuator arm 112 breaks or becomes inoperable, the phi signals would not decrease or would at least not decrease so rapidly as shown in FIG. 4.

To determine the second slope S2, the slope of the lagged phi signal $\varphi_L$ is calculated after the actuation command AC for a predetermined time. The predetermined time may be calculated as a number of time steps or iterations of the control logic, for example, or may simply be a set time. For instance, for this exemplary embodiment, the predetermined time is about six tenths of a second (0.6 s), or from eighty-eight hundredths seconds (0.88 s) to one and thirty-eight hundredths seconds (0.88 to 1.38 s) (see FIG. 5). In alternative embodiments, the predetermined time may be two seconds (2 s), one second (1 s), or a half second (½ s). The second slope S2, or slope of the lagged phi signal $\varphi_L$ after the actuation command AC over the predetermined time, is plotted on the chart in FIG. 5 at time t=0, or after the actuation command AC, as a function of time.

Notably, the second slope S2 has its maximum negative trend from eighty-eight hundredths seconds (0.88 s) to about ninety-five hundredths seconds (0.95 s). At about ninety-five hundredths seconds (0.95 s), the second slope S2 reaches its maximum negative slope. This corresponds with the relatively rapid decrease in the lagged phi signal $\varphi_L$ just after t=0, or about eighty-eight hundredths seconds (0.88 s). After reaching the maximum negative slope, although still a negative slope, the second slope S2 begins to increase and move toward a slope of zero (0) as shown in FIG. 5. This corresponds to the lagged phi signal $\varphi_L$ stabilizing from about one second (1 s) to one and thirty-eight hundredths seconds (1.38 s).

At (308), the method (300) includes generating a delta slope based at least in part on the difference between the first slope and the second slope. Continuing with the example above, the first slope S1 and the second slope S2 are shown in FIG. 5 plotted as functions of time. To generate the delta slope, denoted by ΔS, the first slope S1 is subtracted from the second slope S2, or stated differently, S2−S1=ΔS. as depicted in FIG. 5, utilizing the slope axis on the right of the chart, the resultant delta slope ΔS is shown plotted as a function of time. As shown, delta slope ΔS has substantially the same shape as the second slope S2, except that the first slope S1 has been subtracted therefrom.

At (310), the method (300) includes determining whether the delta slope exceeds a predetermined threshold to determine whether the failure event has occurred. With reference to the example above, once the delta slope ΔS is determined at (308), the delta slope ΔS is compared to or against a predetermined threshold $T_C$ when the actuating component is commanded close (with the "T" representing the threshold and the "C" representing that the threshold corresponds to the BAI valve 102 closing). The predetermined threshold $T_C$ may be set, e.g., by using engine test data to determine a threshold that accounts for expected delta slopes ΔS for a spectrum of open to closed valve modulations. For this exemplary embodiment, if the delta slope ΔS exceeds the predetermined threshold $T_C$, then it is determined that a failure event has not occurred. Stated differently, if the delta slope ΔS exceeds the predetermined threshold $T_C$, then it is determined that the BAI valve 102 was successfully modulated closed by the actuation arm 112 of the actuator 110. On the other hand, if the delta slope ΔS does not exceed the predetermined threshold $T_C$, then it is determined that a failure event has in fact occurred. Stated another way, upon an actuation command AC, the BAI valve 102 did not open.

As shown in FIG. 5, the delta slope ΔS exceeds the predetermined threshold $T_C$ just after eighty-eight hundredths seconds (0.88 s), denoted as point P1. For this embodiment, if the delta slope ΔS exceeds the predetermined threshold $T_C$ at all or just once over time period in which the delta slope ΔS is compared to the predetermined threshold $T_C$, then the threshold has been exceeded and it is determined that a failure event has not occurred. In alternative exemplary embodiments, to prevent inadvertent triggering of the predetermined threshold $T_C$, the delta slop ΔS must exceed the predetermined threshold $T_C$ for a predetermined number of time steps, and if the delta slop ΔS exceeds the predetermined threshold $T_C$ for the predetermined number of time steps, the failure event is determined not to have occurred. For instance, in one exemplary embodiment, the predetermined number of time steps is at least two consecutive time steps. In yet other exemplary embodiments, to prevent inadvertent triggering of the predetermined threshold $T_C$, the delta slop ΔS must exceed the predetermined threshold $T_C$ for a predetermined time, and if the delta slop ΔS exceeds the predetermined threshold $T_C$ for the predetermined time, the failure event is determined not to have occurred. For instance, in one exemplary embodiment, the predetermined time is at least one quarter of a second (¼ second). For this exemplary embodiment, the delta slope ΔS exceeds the predetermined threshold $T_C$ from Point P1 at about eighty-eight hundredths seconds (0.88 s) to Point P2 at about one and two tenths seconds (1.2 s). Thus, for embodiments in which the delta slop ΔS must exceed the predetermined threshold $T_C$ for a quarter second (¼ s), the threshold has been exceeded for the predetermined time.

Further, in some embodiments, during determining at (310), the delta slope ΔS is not evaluated against the predetermined threshold $T_C$ until after a predetermined delay D has elapsed after the actuation command AC. This may allow for any noise in the signals to dissipate immediately after an actuation command AC. As one example, a predetermined delay D may be five hundredths of a second (0.05 s) after t=0 (i.e., after the actuation command AC).

Figure 6:
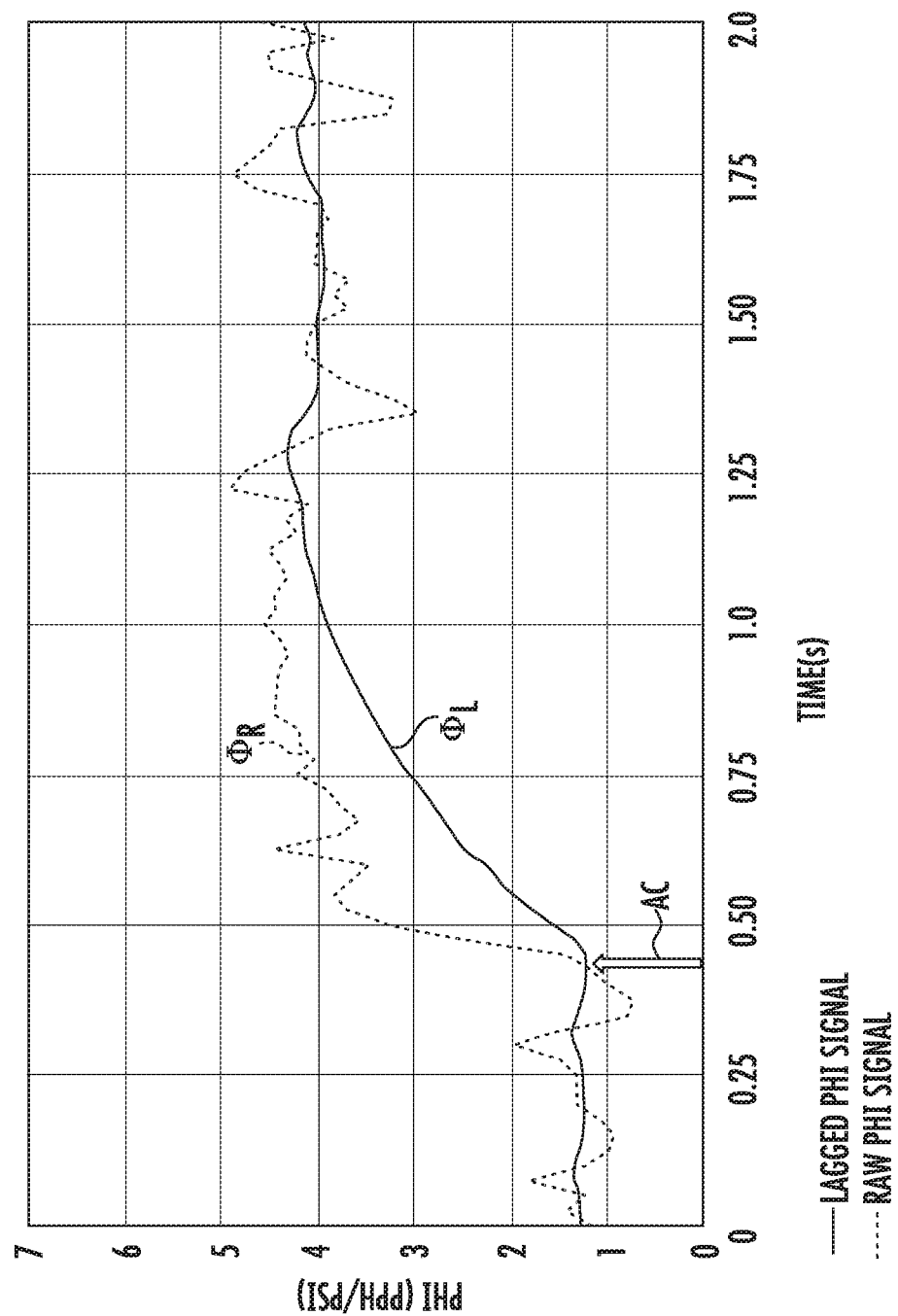
FIG. 6 provides a chart depicting a raw phi signal as a function of time and a lagged signal as a function of time for an actuating component commanded to move to a more open position according to an exemplary embodiment of the present disclosure.
Figure 7:
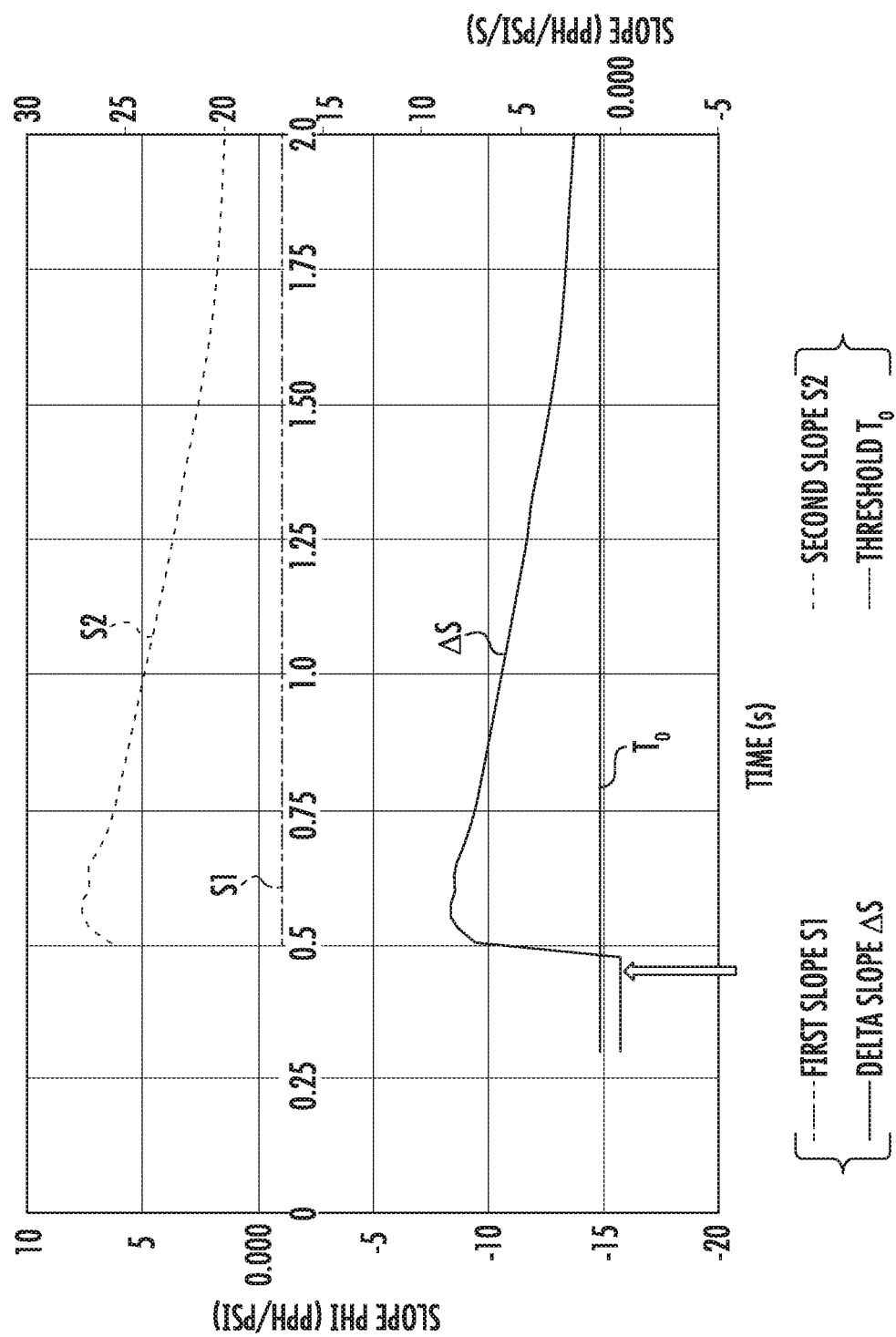
FIG. 7 provides another chart depicting a first slope as a function of time compared with a second slope as a function of time, as well as a delta slope as a function of time compared with a predetermined threshold according to an exemplary embodiment of the present disclosure.

FIGS. 6 and 7 provide similar charts to the charts of FIGS. 4 and 5, respectively, however the raw and lagged phi signals $\varphi_R$, $\varphi_L$ of FIG. 6 correspond to BAI valve 102 being modulated from a closed position to an open position.

Similarly, the chart of FIG. 7 corresponds to the slopes of the lagged phi signal $\varphi_L$ of FIG. 6. The primary difference between the signals representing the BAI valve 102 closing in FIGS. 4 and 5 and the signals representing the BAI valve 102 opening in FIGS. 6 and 7 is that the slopes are positive in FIGS. 6 and 7 in contrast to the negative slopes depicted in FIGS. 4 and 5. Despite the fact that the slopes in FIGS. 6 and 7 are positive, method (300) may be applied to detect latent failures in actuation systems in the same manner as described above with respect to method (300) applying to BAI valve 102 closing.

In one exemplary embodiment, with reference to FIGS. 6 and 7, a lagged phi signal $\varphi_L$ is generated by controller 90 based at least in part on the raw phi signal $\varphi_R$ (FIG. 6). Upon an actuation command AC, e.g., at about four tenths seconds (0.4 s), the first slope S1 is determined for a predetermined time prior to the actuation command AC. For this embodiment, the predetermined time is two seconds (2 s), and thus, to determine the first slope S1, the slope of the lagged phi signal $\varphi_L$ is calculated for two seconds (2 s) prior to the actuation command AC. The first slope S1 is plotted on the chart in FIG. 7 (with respect to the axis on the left of the chart) as a function of time. The second slope S2 is also determined. In particular, the second slope S2 is determined for a predetermined time after the actuation command AC at about four tenths seconds (0.4 s). For this embodiment, the predetermined time is one and five tenths seconds (1.5 s), and thus, to determine the second slope S2, the slope of the lagged phi signal $\varphi_L$ is calculated for one and five tenths seconds (1.5 s) after the actuation command AC. The second slope S2 is plotted on the chart in FIG. 7 (with respect to the axis on the right of the chart) as a function of time.

Thereafter, with reference to FIG. 7, a delta slope ΔS is generated based at least in part on the difference between the first slope S1 and the second slope S2. In particular, the first slope S1 is subtracted from the second slope S2 to yield the delta slope ΔS. The delta slope ΔS is plotted on the chart in FIG. 7 (with respect to the axis on the right of the chart) as a function of time. Once the delta slope ΔS is generated, it is determined whether the delta slope ΔS exceeds a predetermined threshold $T_O$ (with the "T" representing the threshold and the "O" representing that the threshold corresponds to the BAI valve 102 opening) so that it may be determined whether a failure in the actuation system has occurred. For this exemplary embodiment, as the delta slope ΔS exceeds the predetermined threshold $T_O$, the BAI valve 102 has in fact modulated to an open position, and accordingly, it may be determined that no failures in the actuation system are present. In the event the delta slope ΔS does not exceed the predetermined threshold $T_O$, it is determined that the actuating system has a failure.

At (312), with reference again to FIG. 3, the method (300) includes generating, if the event has occurred, a control action associated with resolving the event. As one example, if the failure event has occurred as determined at (310), the control action includes setting a fault (e.g., raising a failure flag) and communicating the fault to one or more computing devices of the vehicle to which the engine is mounted, such as e.g., an aircraft. For instance, upon detection of a failure event by the FADEC of the controller 90 of a turbofan engine mounted to an aircraft, the controller 90 may set the fault as a failure flag and then communicate the failure flag to an onboard computing system of the aircraft, such as e.g., an FMS. The FMS or other onboard computing system may then notify the pilot and/or the ground maintenance crew at an airport of the detected failure event. In this way, the pilot could avoid icing conditions or attempt to fix icing issue by other means and/or the ground crew at the airport would know to address this failure at the next available opportunity. As such, in some implementations of the method (300), the method includes setting, by the one or more controllers, a fault flag. The method also includes routing the fault flag to the onboard computing system (e.g., the FMS). For example the fault flag may be routed from the controller 90 to the FMS via a communication network, as described previously. The method (300) further includes communicating the fault flag to an offboard computing system. For example, the offboard computing system may be a maintenance computing system configured to schedule maintenance repairs.

As another example, redundant systems could be used to compensate for the detected failure event. For instance, if a failure of a BAI valve has been detected, an electric heater positioned at the splitter 51 (FIGS. 1 and 2) could be used to warm the splitter or other surfaces in need of anti-icing. As yet another example, other actuating systems of the turbofan engine 10 may be controlled in such a way so as to compensate for the failure event. Other control actions are also possible.

It will be appreciated that the BAI assembly 100 is one of many actuating systems to which method (300) may be applied. Method (300) may apply to other actuating systems as well. For instance, in some exemplary embodiments, the actuating system may be or include one or more High Pressure Turbine Active Clearance Control (HPTACC) systems, Low Pressure Turbine Active Clearance Control (LPTACC) systems, Core Compartment Cooling (CCC) systems, Nacelle Anti-Ice (NAI) systems, Start Bleed Valve (SBV) systems, Transient Bleed Valve (TBV) systems, Modulated Turbine Cooling (MTC) systems, etc.

Figure 8:
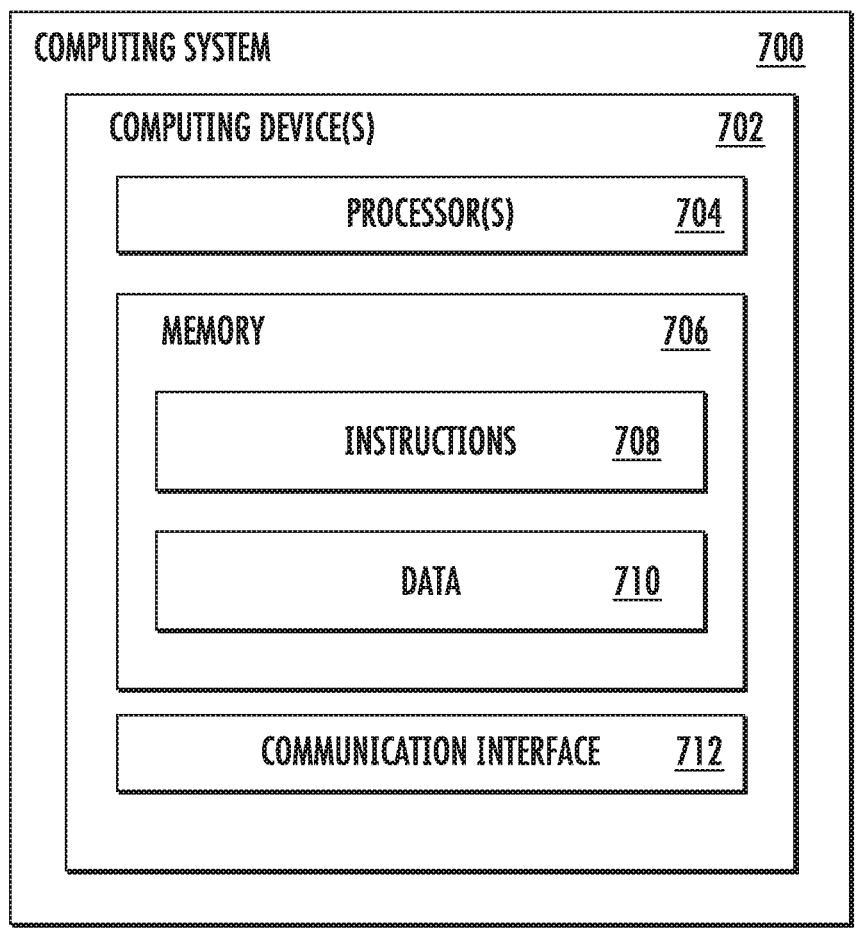
FIG. 8 provides a block diagram of an exemplary computing system according to an exemplary embodiment of the present disclosure.

FIG. 8 provides a block diagram of an example computing system 700 that is representative of an onboard computing system of an aircraft or an offboard computing system that may be used to implement the methods and systems described herein according to exemplary embodiments of the present disclosure. As shown, the computing system 700 may include one or more computing device(s) 702. The one or more computing device(s) 702 may include one or more processor(s) 704 and one or more memory device(s) 706. The one or more processor(s) 704 may include any suitable processing device, such as a microprocessor, microcontroller, integrated circuit, logic device, or other suitable processing device. The one or more memory device(s) 706 may include one or more computer-readable media, including, but not limited to, non-transitory computer-readable media, RAM, ROM, hard drives, flash drives, or other memory devices.

The one or more memory device(s) 706 may store information accessible by the one or more processor(s) 704, including computer-readable instructions 708 that may be executed by the one or more processor(s) 704. The instructions 708 may be any set of instructions that when executed by the one or more processor(s) 704, cause the one or more processor(s) 704 to perform operations. The instructions 708 may be software written in any suitable programming language or may be implemented in hardware. In some embodiments, the instructions 708 may be executed by the one or more processor(s) 704 to cause the one or more processor(s) 704 to perform operations, such as implementing one or more of the processes mentioned above.

The memory device(s) 704 may further store data 710 that may be accessed by the processor(s) 704. For example, the data 710 may include a third instance of shared data for a gas turbine engine, as described herein. The data 710 may include one or more table(s), function(s), algorithm(s), model(s), equation(s), etc. according to example embodiments of the present disclosure.

The one or more computing device(s) 702 may also include a communication interface 712 used to communicate, for example, with the other components of system. The communication interface 712 may include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein may be implemented using a single computing device or multiple computing devices working in combination. Databases, memory, instructions, and applications may be implemented on a single system or distributed across multiple systems. Distributed components may operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for detecting an event of an actuating system of a gas turbine engine for an aircraft, the method comprising:
   determining, by one or more controllers, a first slope based at least in part on a signal descriptive of an engine operating characteristic as a first function of time prior to an actuation command;
   determining, by the one or more controllers, a second slope based at least in part on the signal descriptive of the engine operating characteristic as a second function of time after the actuation command;
   generating, by the one or more controllers, a delta slope based at least in part on the difference between the first slope and the second slope;
   determining, by the one or more controllers, whether the delta slope exceeds a predetermined threshold to determine whether the event has occurred; and
   generating a control action associated with resolving the event if the delta slope does not exceed the predetermined threshold for a predetermined time.

2. The method of claim 1, wherein the engine operating characteristic is phi, wherein phi is defined as a mass flow rate over a pressure of a turbine engine.

3. The method of claim 1, wherein generating the delta slope comprises subtracting the first slope from the second slope, and wherein if the delta slope exceeds the predetermined threshold, then the event is determined not to have occurred.

4. The method of claim 1, wherein generating the delta slope comprises subtracting the first slope from the second slope, and wherein if the delta exceeds the predetermined threshold for a predetermined time, then the event is determined not to have occurred.

5. The method of claim 1, wherein during determining, the delta slope is not evaluated against the predetermined threshold until after a predetermined delay has elapsed after the actuation command.

6. The method of claim 1, wherein the actuating system is within one or more of a booster anti-ice system, a high pressure turbine active clearance control system, a low pressure turbine active clearance control system, a core compartment cooling system, a nacelle anti-ice system, a start bleed valve system, a transient bleed valve system, or a modulated turbine cooling system.

7. The method of claim 1, wherein the signal is a lagged signal generated based at least in part on a raw signal descriptive of the engine operating characteristic as a function of time.

8. The method of claim 7, wherein the first slope is determined by calculating a slope of the lagged signal over a predetermined time prior to the actuation command.

9. The method of claim 8, wherein during calculating the slope of the lagged signal over the predetermined time prior to the actuation command, wherein the slope is averaged.

10. The method of claim 1, wherein generating the delta slope comprises subtracting the first slope from the second slope, and wherein if the delta exceeds the predetermined threshold for a predetermined number of time steps, then the event is determined not to have occurred.

11. The method of claim 10, wherein the first function of time is different from the second function of time.

12. The method of claim 1, wherein the actuating system comprises a valve movable between a closed position and an open position, an actuator for actuating the valve, and an actuator arm coupling the valve with the actuator.

13. The method of claim 12, wherein the aircraft comprises an onboard computing system communicatively coupled with the one or more controllers, and wherein generating, if the event has occurred, the control action associated with resolving the event comprises:
   setting, by the one or more controllers, a fault flag;
   routing the fault flag to the onboard computing system; and
   communicating the fault flag to an offboard computing system.

14. A turbine engine, comprising:
   a booster anti-icing valve;
   an actuator for modulating the booster anti-icing valve, the actuator having an actuator arm operatively coupling the actuator with the booster anti-icing valve;
   a fuel flow sensor;
   a pressure sensor;
   a controller communicatively coupled with the actuator, the fuel flow sensor, and the pressure sensor, the controller configured to:
      communicate an actuation command to the actuator to modulate the actuating component;
      determine a first slope based at least in part on a signal descriptive of an engine operating characteristic as a function of time prior to the actuation command;

determine a second slope based at least in part on the signal descriptive of the engine operating characteristic as a function of time after the actuation command;

generate a delta slope based at least in part on the difference between the first slope and the second slope;

determine whether the delta slope exceeds a predetermined threshold to determine whether the event has occurred; and generate, if the event has occurred, a control action associated with resolving the event.

15. The turbine engine of claim 14, wherein the signal is a lagged signal generated based at least in part on a raw signal descriptive of the engine operating characteristic as a function of time.

16. The turbine engine of claim 14, wherein hot bleed air flows through the booster anti-icing valve and through a duct toward a splitter nose that is generally longitudinally forward of one or more inlet guide vanes when the booster anti-icing valve is in an open position.

17. A method for detecting a failure event of an actuating system for a turbine engine, the method comprising:

generating, by one or more controllers, a lagged signal based at least in part on a raw signal that is descriptive of an engine operating characteristic as a function of time;

determining, by the one or more controllers, a first slope based at least in part on the lagged signal for a predetermined time prior to an actuation command;

determining, by the one or more controllers, a second slope based at least in part on the lagged signal for a predetermined time after the actuation command;

generating, by the one or more controllers, a delta slope based at least in part on the difference between the first slope and the second slope;

determining, by the one or more controllers, whether the delta slope exceeds a predetermined threshold to determine whether the failure event has occurred; and operating, if the event has occurred, a redundant system to compensate for the detected failure event.

18. The method of claim 17, wherein the lagged signal is comprised of a series of vector points, and wherein the first slope is determined by calculating a slope between the vector points for the predetermined time and then calculating an average slope of the slopes between the vector points, wherein the first slope is the average slope.

19. The method of claim 17, wherein the slopes between the vector points and the average slope are calculated after the actuation command.

20. The method of claim 17, wherein the engine operating characteristic is phi, wherein phi is defined as a mass flow rate over a pressure of the turbine engine.

* * * * *